(12) United States Patent
Borden et al.

(10) Patent No.: US 7,181,377 B1
(45) Date of Patent: Feb. 20, 2007

(54) METHOD OF MODIFYING A VOLUME MESH USING SHEET EXTRACTION

(75) Inventors: Michael J. Borden, Albuquerque, NM (US); Jason F. Shepherd, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 573 days.

(21) Appl. No.: 10/601,370

(22) Filed: Jun. 23, 2003

Related U.S. Application Data

(60) Provisional application No. 60/390,956, filed on Jun. 24, 2002.

(51) Int. Cl.
*G06F 17/50* (2006.01)
*G06T 17/20* (2006.01)

(52) U.S. Cl. .............................. 703/2; 703/7; 345/421; 345/423

(58) Field of Classification Search ............... 703/2, 703/7; 345/421, 423; 716/20
See application file for complete search history.

(56) References Cited

U.S. PATENT DOCUMENTS

| | | | | |
|---|---|---|---|---|
| 5,553,206 A | * | 9/1996 | Meshkat | 345/423 |
| 5,689,577 A | * | 11/1997 | Arata | 382/128 |
| 5,768,156 A | | 6/1998 | Tautges et al. | |
| 6,356,262 B1 | * | 3/2002 | Klosowski et al. | 345/421 |
| 6,600,487 B1 | * | 7/2003 | Henn et al. | 345/423 |
| 6,825,839 B2 | * | 11/2004 | Huang et al. | 345/423 |
| 6,879,946 B2 | * | 4/2005 | Rong et al. | 703/2 |

\* cited by examiner

*Primary Examiner*—Thai Phan
(74) *Attorney, Agent, or Firm*—Madelynne J. Farber

(57) ABSTRACT

A method and machine-readable medium provide a technique to modify a hexahedral finite element volume mesh using dual generation and sheet extraction. After generating a dual of a volume stack (mesh), a predetermined algorithm may be followed to modify the volume mesh of hexahedral elements. The predetermined algorithm may include the steps of determining a sheet of hexahedral mesh elements, generating nodes for merging, and merging the nodes to delete the sheet of hexahedral mesh elements and modify the volume mesh.

29 Claims, 15 Drawing Sheets

100

115

FIG. 5A
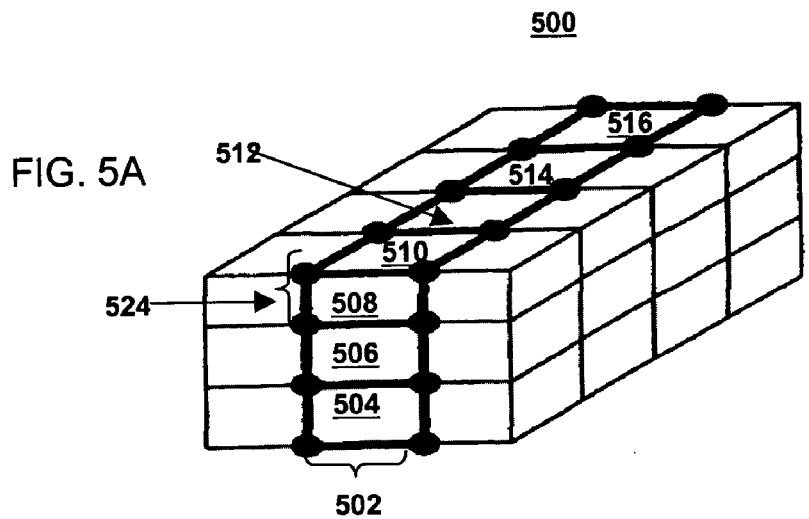
FIG. 5B
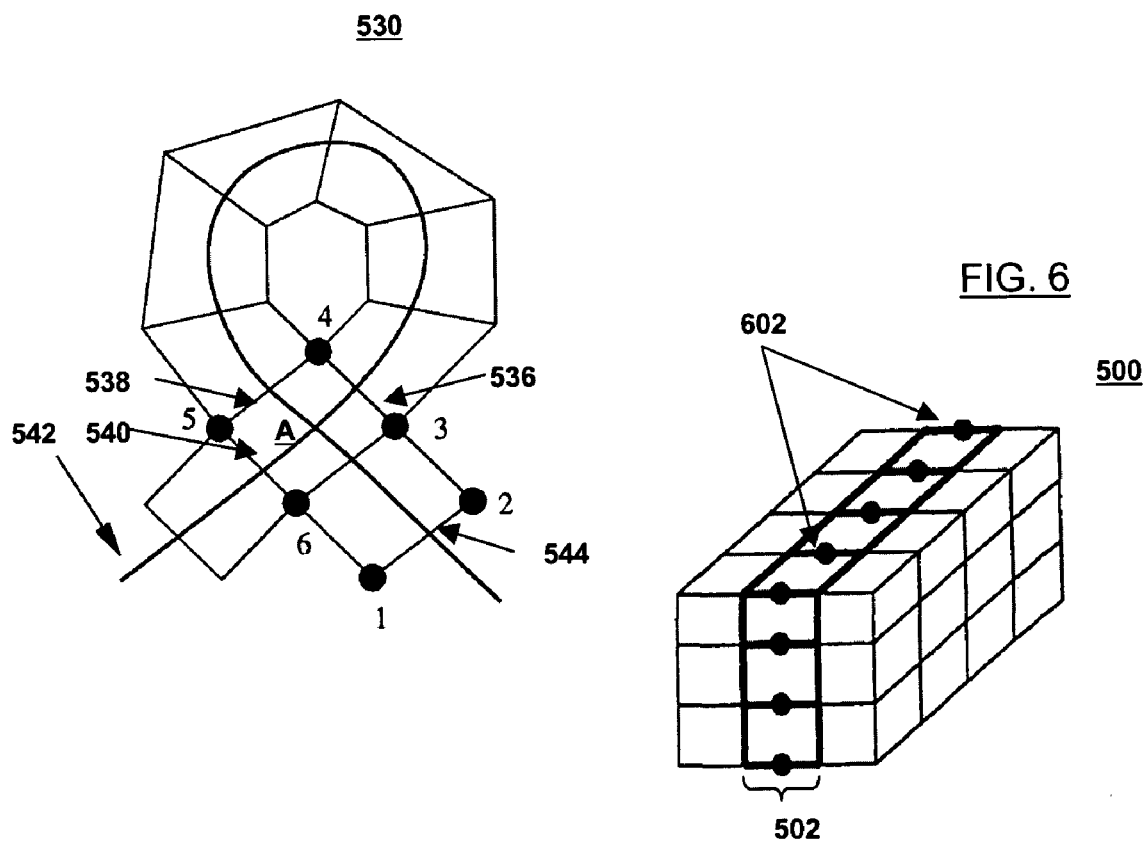
FIG. 6

702

800

1500

METHOD OF MODIFYING A VOLUME MESH USING SHEET EXTRACTION

CROSS-REFERENCE

This application claims the benefit of U.S. provisional application Ser. No. 60/390,956, filed Jun. 24, 2002.

The United States Government has rights in this invention pursuant to Department of Energy Contract No. DE-AC04-94AL85000 with Sandia Corporation.

TECHNICAL FIELD

The present invention relates generally to computer modeling of physical systems. It particularly relates to computer modeling allowing modification of a finite element volume mesh using dual generation and sheet extraction.

BACKGROUND OF THE INVENTION

With the advancement of computer technologies and understanding of basic physical phenomena or systems (e.g., engine operation, fluid flow, heat transfer, structural stress and strain analysis, etc.), three-dimensional (3D) computer simulation has become more of an important feature in physical system development, analysis, and evaluation. The computer simulation (modeling) often involves the building of a finite element mesh (collection of discrete set of points defined as nodes) to model the physical system. The accuracy of finite element mesh generation is related to the geometric complexity (including representing the physical system by a set of mathematical equations) of the physical system including the number of finite elements in the mesh, the order of those elements, and the quality of those finite elements.

A number of mesh-generating algorithms (e.g., parametric mapping, Dicer algorithm, Paving algorithm, Whisker-Weaving algorithm, sweeping algorithm, etc.) have been developed to attempt to generate high-quality meshes (including volume meshes) with greater accuracy and reduced user interaction for generating the mesh. However, each algorithm has its own set of strengths and weaknesses, and therefore may only be suitable for a particular geometry while being ineffective for another. Therefore, there is still a need to generate high-quality meshes for all types of geometry, including hexahedral volume meshes, that are robust, accurate, and reduce user interaction time. Additionally, modification of a volume (3D) mesh is an important feature to improving mesh quality by allowing removal of poor quality elements (e.g., inverted elements) from the mesh to generate a coarser volume mesh and more accurate analysis results.

As described herein, the generation of a dual (for a volume mesh) within a dual space may be an effective tool for producing a high-quality volume mesh for three-dimensional elements (objects) by providing an alternative geometric representation of the volume mesh and more clearly defining global connectivity constraints for the mesh. Advantageously, the dual of a mesh may be generated, edited, and then converted back to a volume mesh to improve analysis results. It is noted that terms used within the specification, in accordance with embodiments of the present invention, will be defined within the specification and further definition may be found within the Glossary of Terms in Appendix A. FIGS. 1A, 1B illustrate the process for generating a dual of a 3D element as found in the prior art. FIG. 1A shows a stack (column) 100 of 3D elements (mesh) in primal space (e.g., hexahedral elements). Each hexahedral element of the stack 100 includes six quadrilateral faces 108 and eight nodes 110 formed from three edges 112. It is noted that stack 100 may form the complete volume mesh. A dual 115 of the volume elements (mesh) 100 may be generated by connecting opposing faces of a hexahedral element using a (volume) chord 102 (see Appendix A for glossary of terms) as shown in FIG. 1B. As shown in FIG. 1B, chord 102 (a volume dual chord) connects the opposite edges for a stack of hexahedral elements 114, 116, 118, 120. In the dual space generated, chord 102 is equivalent (the dual) to the row of hexahedral elements 114, 116, 118, 120 in the primal space.

The generation of the dual may continue as shown in FIG. 1B as more opposite faces of the hexahedral elements 114, 116, 118, 120 are connected using further chords (e.g., 101, 103, 105, 107, 109). The chords are generated with adherence to the following rules: 1) a chord that begins on a boundary must terminate on the boundary, or 2) a chord may form an internal closed loop.

To help complete the dual 115, a twist plane 202 may be generated as shown in FIG. 2A (from the prior art) that carries a chord 102 along an intersecting edge. The twist plane 202 may be a continuous, three-dimensional surface which adheres to the following rule: twist planes may be nowhere tangent or coplanar. FIG. 2A found in the prior art shows three intersecting twist planes 202, 204, 206 that define a 3D cell region (hexahedral element) 208. Three-dimensional (3D) cell region 208 may be defined as an n-sided polyhedron with the faces formed by individual twist planes 202, 204, 206 that carry (formed from) chords 102, 101, 109, respectively (see glossary in Appendix A). As shown in FIG. 2B from the prior art, a centroid 216 may be formed from the three intersecting chords 101, 102, 109 generated from the intersecting twist planes 202, 204, 206 where the intersecting chords include one 3D cell region (hexahedral element) 208. FIG. 3 found in the prior art shows a twist plane 302 in a hexahedral mesh 300 that may be used to generate a sheet of hexahedral mesh elements for extraction to modify the mesh 300. As shown in FIG. 2B, every 3D cell region 208 includes a single node (e.g., node 210) from the original stack 100. Cell region 208 is equivalent (the dual) to node 210 within the dual space generated. Also, centroid 216 is equivalent (the dual) to hexahedral element 114 within the dual space generated. Also, Table 1 in Appendix B shows the relationship between the original surface elements and dual entities in three dimensions.

Therefore, due to the disadvantages of current volume meshing algorithms, there is a need to provide a computer modeling technique that uses duals to modify hexahedral volume meshes while maintaining accuracy, reduced user interaction time, and high quality of the resulting meshes to generate a coarser hexahedral volume mesh.

SUMMARY OF THE INVENTION

The method and machine-readable medium of the present invention overcome the previously mentioned problems by providing a technique to modify a hexahedral finite element volume mesh using dual generation and sheet extraction. After generating a dual of a volume stack (mesh), a predetermined algorithm may be followed to modify the volume mesh of hexahedral elements. The predetermined algorithm may include the steps of determining a sheet of hexahedral mesh elements, generating nodes for merging, and merging the nodes to delete the sheet of hexahedral mesh elements and modify the volume mesh.

BRIEF DESCRIPTION OF THE DRAWINGS

FIG. 5A is a block diagram of an exemplary generated dual showing a sheet of polyhedral elements with generated nodes in accordance with embodiments of the present invention.

FIG. 5B is a block diagram of an exemplary generated dual showing a sheet of polyhedral elements with generated nodes at a self-intersection in accordance with embodiments of the present invention.

FIG. 6 is a block diagram of an exemplary generated dual showing a sheet of polyhedral elements with merged nodes in accordance with embodiments of the present invention.

DETAILED DESCRIPTION

Figure 1A:
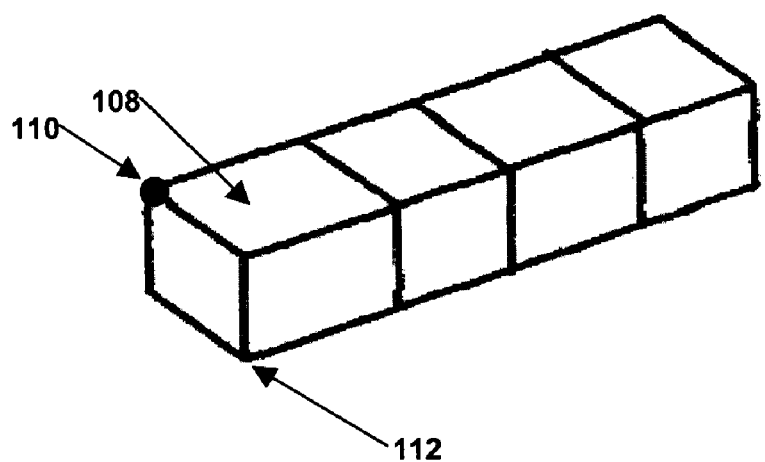
FIG. 1A is a block diagram of exemplary volume elements found in the prior art.
Figure 1B:
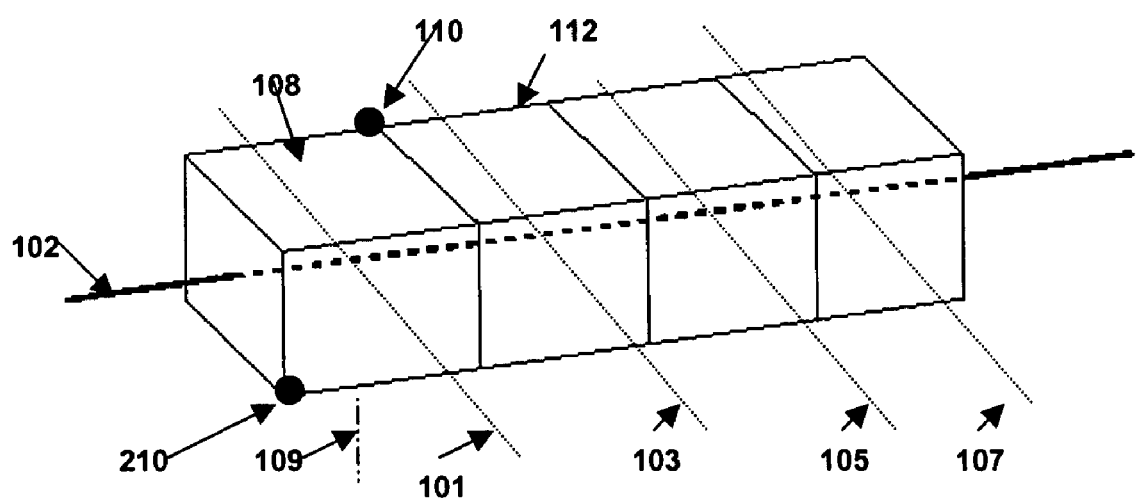
FIG. 1B is a block diagram of exemplary dual generation found in the prior art.
Figure 2A:
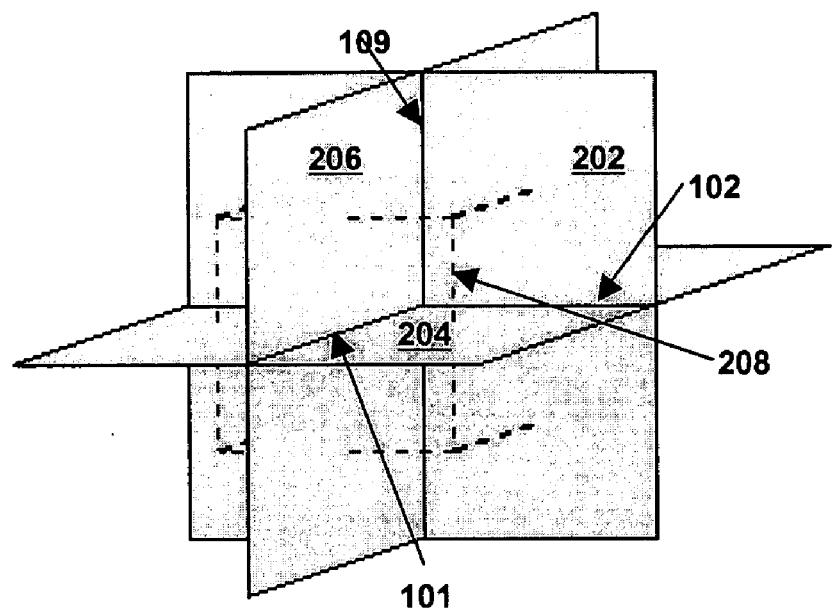
FIG. 2A is a block diagram of an exemplary dual of a volume element generated using twist planes found in the prior art.
Figure 2B:
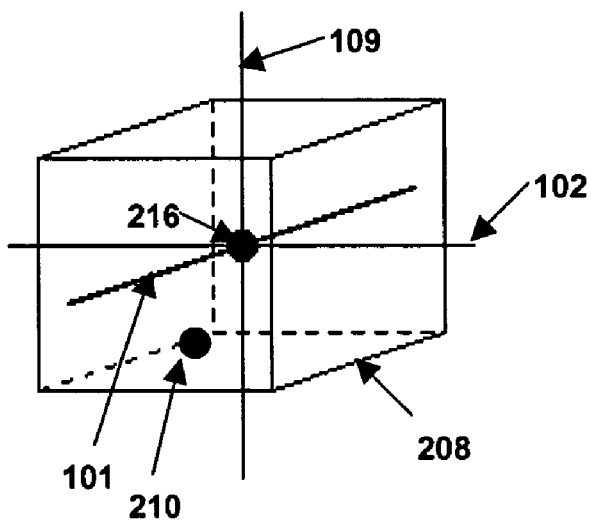
FIG. 2B is a block diagram of exemplary generated dual elements found in the prior art.
Figure 3:
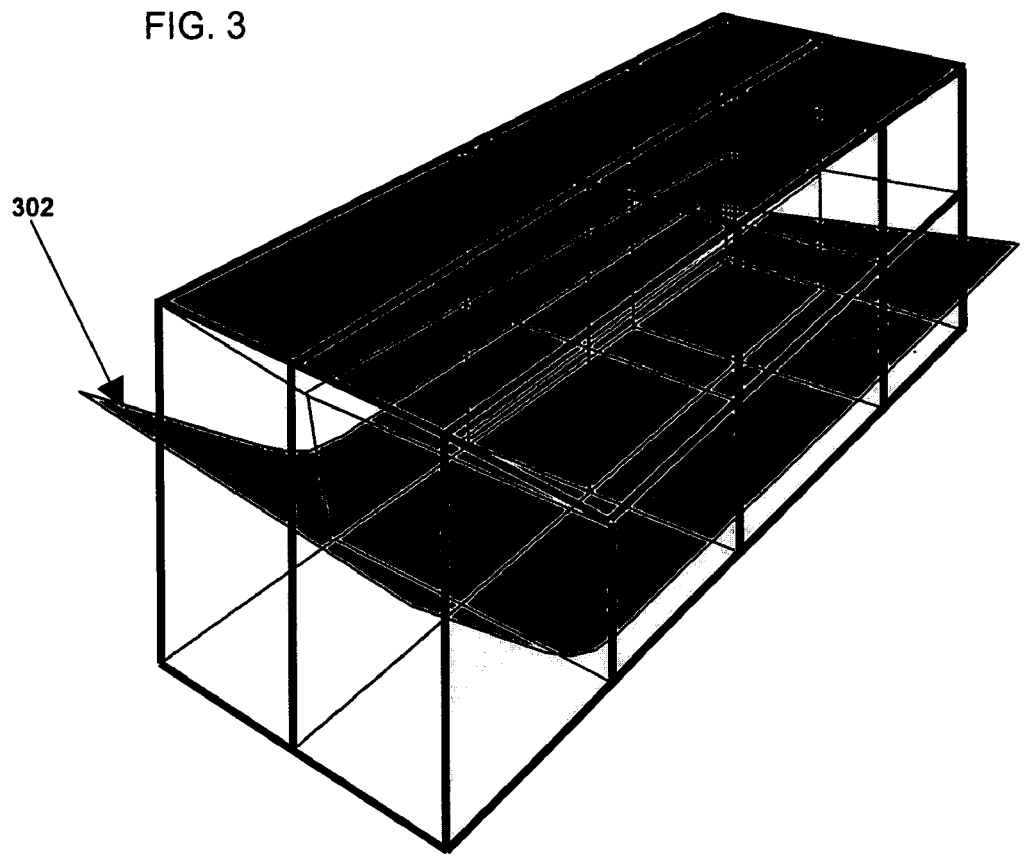
FIG. 3 is a block diagram showing a twist plane found in the prior art.
Figure 4:
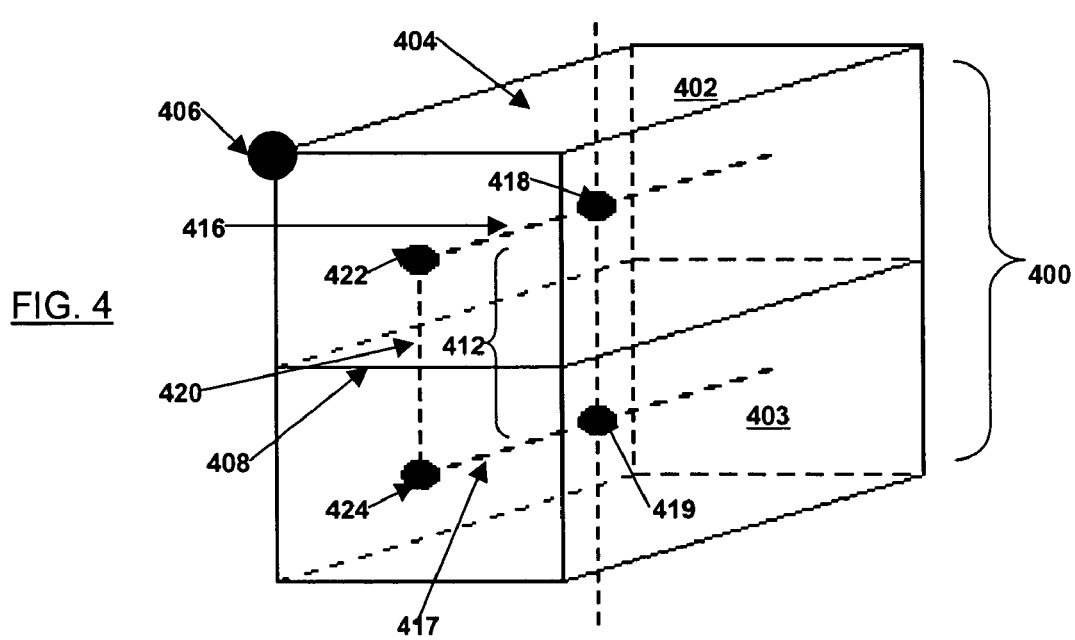
FIG. 4 is a block diagram showing exemplary elements of a sheet extraction algorithm in accordance with embodiments of the present invention.

In accordance with embodiments of the present invention, a sheet extraction algorithm may be followed (as executed by a machine-readable medium) to modify a finite element volume mesh using a dual of a volume mesh (e.g., a three-dimensional brick structure). FIG. 4 shows a block diagram including exemplary elements employed in a sheet extraction algorithm in accordance with embodiments of the present invention. A volume mesh 400 may include a stack of hexahedral elements (hexahedrons) 402, 403 where each hexahedral element includes six quadrilateral faces 404 and eight predetermined nodes 406 with each node formed at an intersection of three edges 408. As shown in FIG. 4, a dual 409 of the stack of hexahedral elements 402 may be generated (following the steps of FIG. 1B) using volume chords 416, 417 where an intersection of multiple chords forms volume centroids 418, 419 in the middle of hexahedral elements 402, 403. Advantageously, a twist plane 412, defined to start from mesh edge 408 including chord 420 intersecting surface centroids 422, 424, may be used to represent a sheet of hexahedral elements from dual 409. Surface centroids (the intersection of two or more surface chords) 422, 424 may represent the end points of volume chords 416, 417. Volume chord 416 may be selected as the chord lying within (along an intersecting edge with other twist planes as shown in FIG. 2A) twist plane 412 to define the sheet of hexahedral mesh elements starting with hexahedral element 402.

Figure 11:
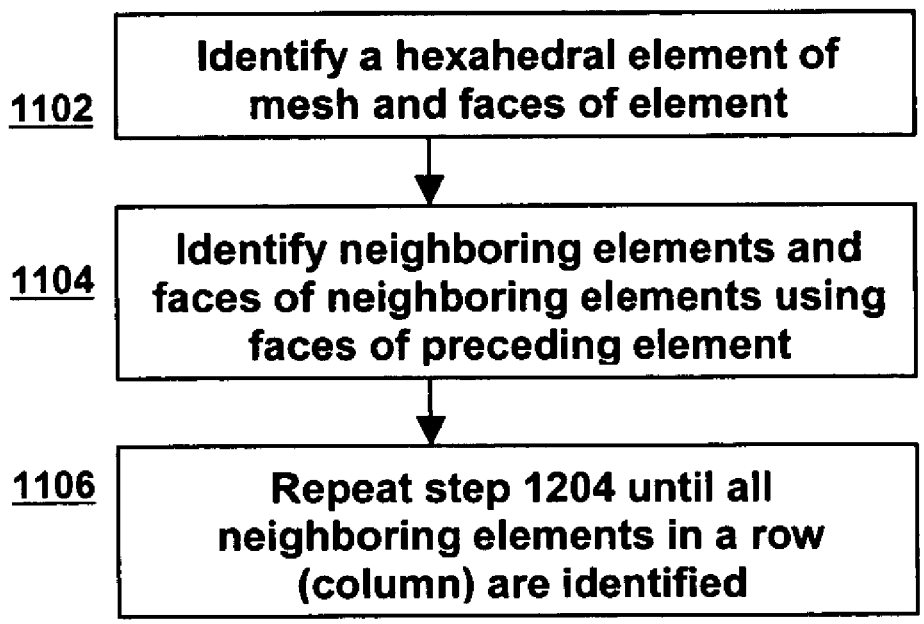
FIG. 11 is a flow process diagram of a sheet identification algorithm to identify a sheet of polyhedral elements within a volume mesh in accordance with embodiments of the present invention.

As shown in FIG. 5A, a sheet 502 of hexahedral elements may be generated from volume mesh 500, starting with initial hexahedral element 504, using the flow process of FIG. 11. The flow process uses the condition of mesh configuration that neighboring hexahedral elements may share one face and lining up hexahedral elements up so that each element has two neighboring elements that are attached to opposing faces will generate columns of hexahedral elements. Following the flow process, at step 1102 the initial hexahedral element 504 in the sheet 502 is identified along with the faces of element 504. At step 1104, neighboring element 506 may be identified using the shared face 508 between initial element 504 and neighboring element 506. At step 1106, the step of 1104 is continued until all neighboring elements (508, 510, 512, 514, 516) in a column are identified to form sheet 502 of hexahedral elements. A predetermined sheet edge criterion/threshold (e.g., reaching an edge of the sheet) may be used to identify when the process has been completed. Advantageously, sheet 502 may be represented by a twist plane (similar to FIG. 4) along a volume chord lying within the twist plane.

Figure 7:
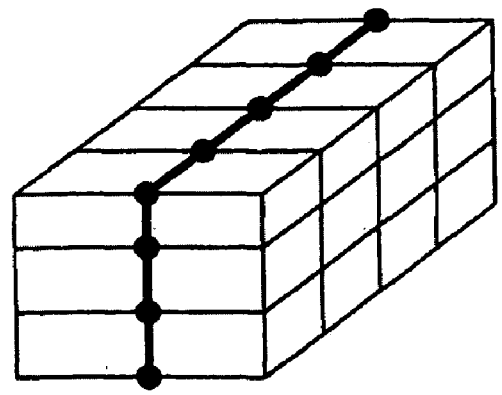
FIG. 7 is a block diagram of an exemplary modified volume mesh from a generated dual after sheet extraction in accordance with embodiments of the present invention
Figure 12:
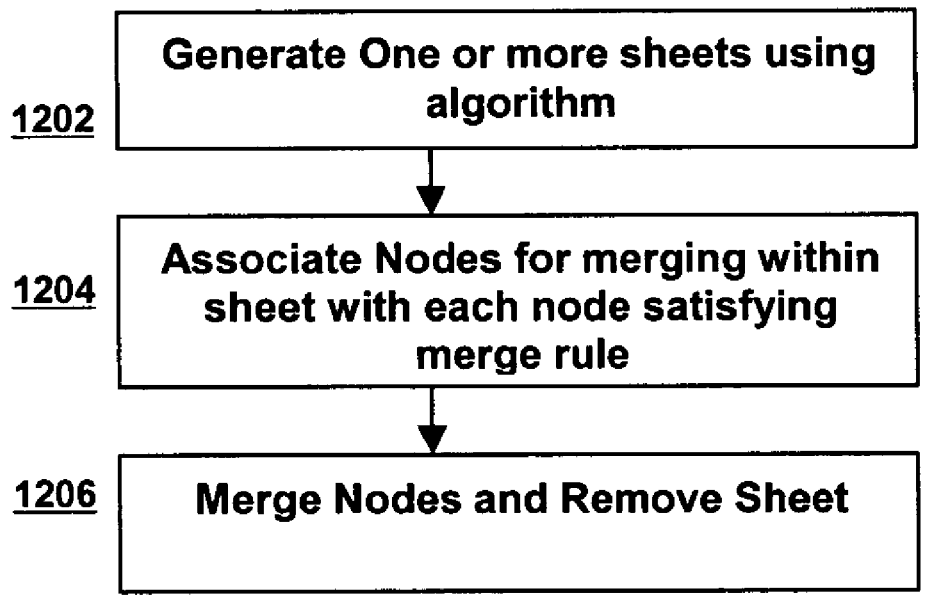
FIG. 12 is a flow process diagram of a sheet extraction algorithm to modify a volume mesh in accordance with embodiments of the present invention.

In accordance with embodiments of the present invention, modification of a volume mesh 500 by sheet extraction may be performed using the flow process of FIG. 12 as shown in FIGS. 5–7. At step 1202, a sheet 502 of hexahedral elements may be generated (using the flow process of FIG. 11) as shown in FIG. 5A. At step 1204, nodes 524 of the hexahedral elements are identified (associated) within the sheet that will be merged to remove the sheet 502 from the mesh 500. Each element (e.g., 508) of the sheet 502 includes a set of opposing faces (top and bottom faces) that are not shared by any other element in the sheet 502. The nodes of one of these faces may be paired with the opposing nodes from the other face to generate four sets (pairs) of opposing nodes 524 as shown in FIG. 5A.

Additionally, in accordance with embodiments of the present invention, a special scenario may arise when a sheet 530 of hexahedral elements intersects itself as shown in FIG.

5B. For this scenario, the elements at the intersection may have neighboring elements from the sheet 530 at all six faces of the hexahedron. As shown in FIG. 5B, the four nodes 3, 4, 5, 6 of element A may be grouped into a single set to be merged into one node since each node pair (3,4), (4,5), and (5,6) share edges (536, 538, 540) bisected by dual chord 542. Alternatively, the typical node set 1, 2 includes only two nodes to be merged into one node as shown in FIG. 5B since these nodes only share a single edge 544 bisected by dual 542.

Advantageously, each node set (e.g., 4 sets) will be merged together after validating that the node set (pair) may be merged in accordance with a predetermined merging rule (threshold). In accordance with the merging rule to be followed, the geometric entity (e.g., vertex, curve, surface, body) owning each node determines whether merger is valid or not. Firstly, the node in the set with an owner having the lowest dimension (e.g., one, two, or three dimensions) may be found, and nodes owned by higher dimension entities are merged into nodes owned by a lower dimension entity if the entities are related. Alternatively, (two) nodes with owners of the same dimension may be merged if the owners are the same entity.

Advantageously, the dimensions of the owning entities of the nodes in the set to be merged determine the location of the node that results from the merger. If the owning entities all have the same dimension, the resulting location will be the average location (for merged nodes 602) of all the nodes as shown in FIG. 6. Alternatively, if the owning entities have different dimensions the resulting node may be located in the same position of the node owned by lowest dimensional entity (e.g., merger of a node on a curve and a node on a surface will result in a merger of the nodes into the node on the curve).

After validation of each node set (pair) merger in accordance with the merger rules, at step 1206 each node set may be merged into one node (e.g., merged nodes 602 as shown in FIG. 6) and the sheet 502 may be extracted (removed) from the mesh 500 to produce modified volume mesh 702 (as shown in FIG. 7).

Figure 13A:
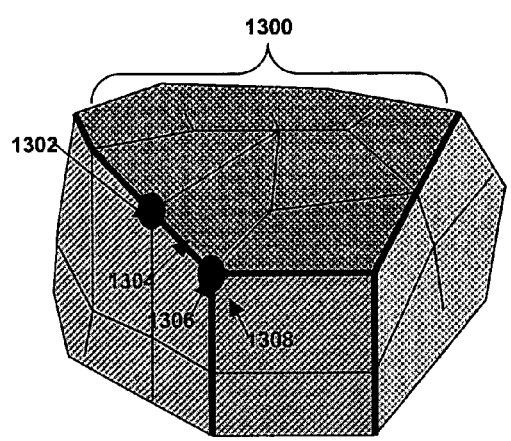
FIGS. 13A–13J are block diagrams of acceptable node mergers for volume mesh modification in accordance with embodiments of the present invention.
Figure 13B:
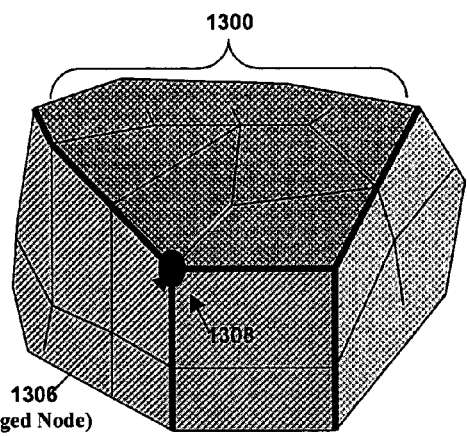

In accordance with embodiments of the present invention, the rules for merging node sets (and resulting locations) are listed in Table 2 in Appendix C and exemplary valid nodes mergers are shown in FIGS. 13A–13J for sheet 1300. As shown in FIGS. 13A, 13B for sheet 1300, a node 1302 on (owned by) a curve 1304 (higher dimensional entity) may be merged into a node 1306 on (owned by) a vertex 1308 (lower dimensional entity) since the vertex 1308 and the curve 1304 are related entities as the vertex 1308 is an endpoint on the curve 1304.

Figure 13C:
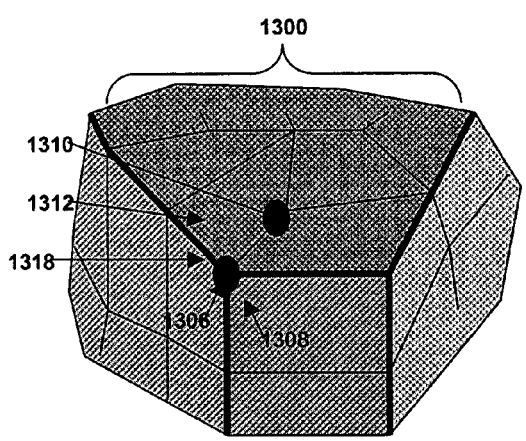
Figure 13D:
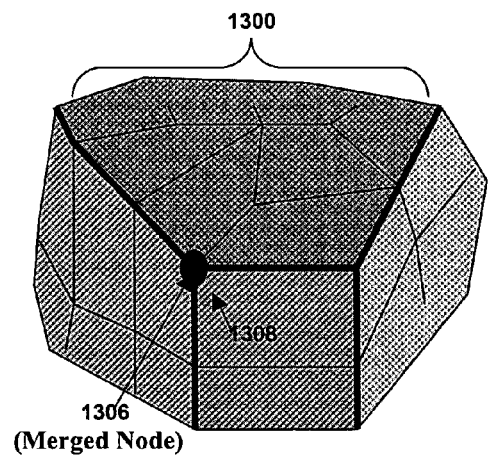

Similarly, as shown in FIGS. 13C, 13D, a node 1310 owned by a surface 1312 (higher dimensional entity) may be merged into node 1306 owned by vertex 1308 (lower dimensional entity) since the vertex 1308 and the surface 1312 are related entities as the vertex 1308 is on the boundary 1318 of surface 1312.

Figure 13E:
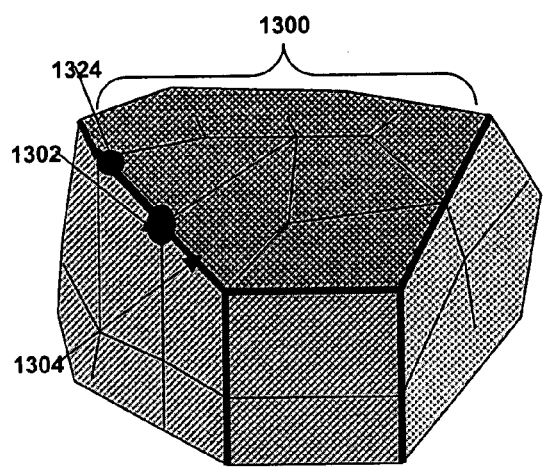
Figure 13F:
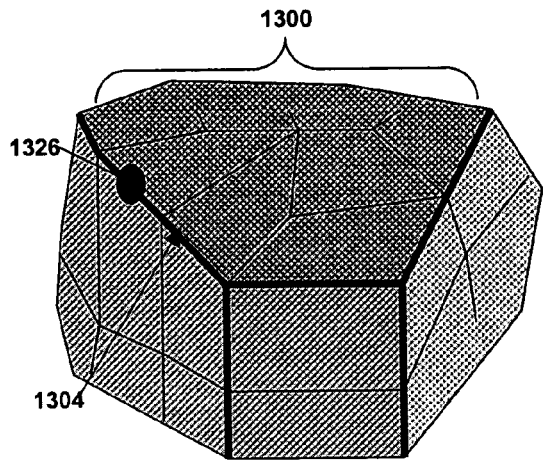

Similarly, as shown in FIGS. 13E, 13F, node 1302 owned by curve 1304 may be merged with a node 1324 (at merged node 1326 at an average location of nodes 1302, 1324) owned by curve 1304 (same dimension) since the curves 1304 are the same entity.

Figure 13G:
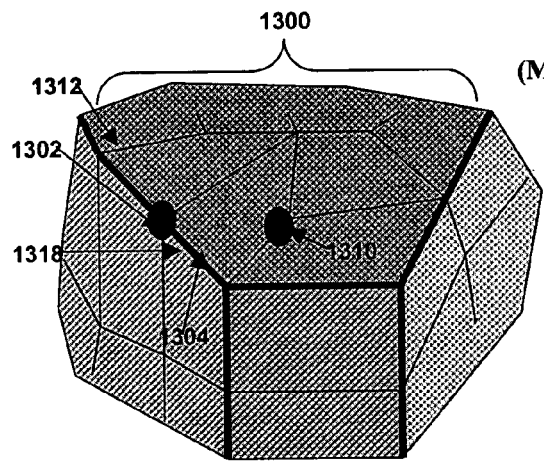
Figure 13H:
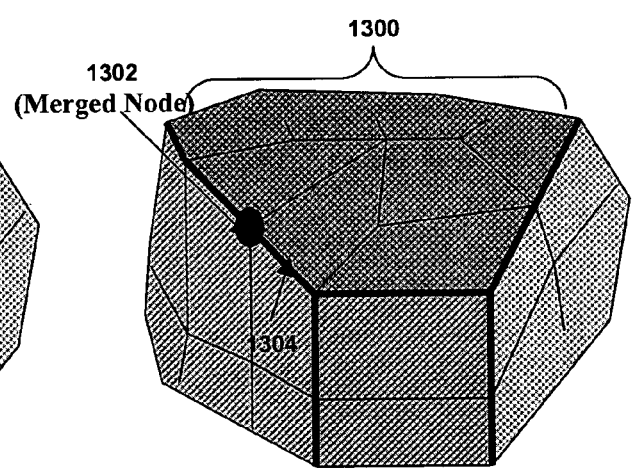

Also, as shown in FIGS. 13G, 13H, node 1310 owned by surface 1312 (higher dimensional entity) may be merged into node 1302 owned by curve 1304 (lower dimensional entity) since the surface 1312 and the curve 1304 are related entities since the curve 1304 forms part of boundary 1318 for surface 1312.

Figure 13I:
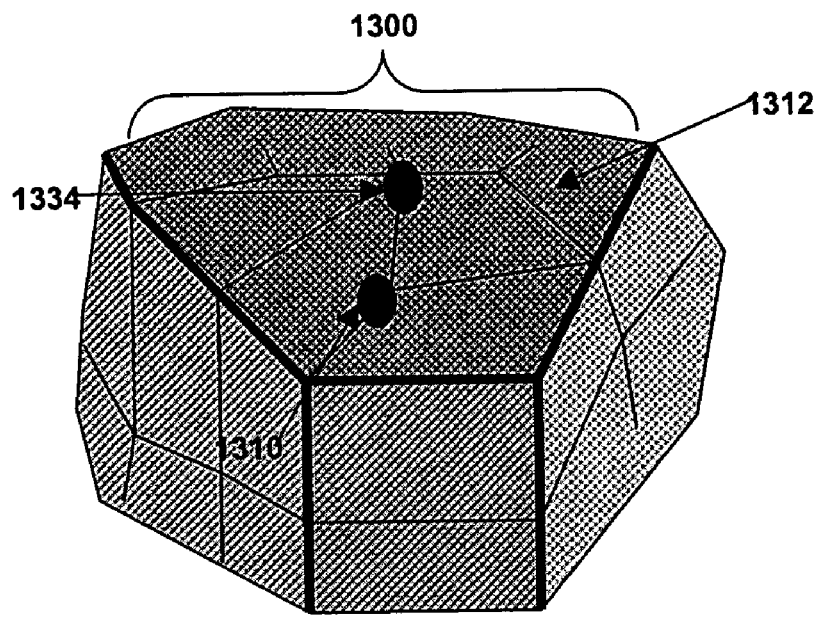
Figure 13J:
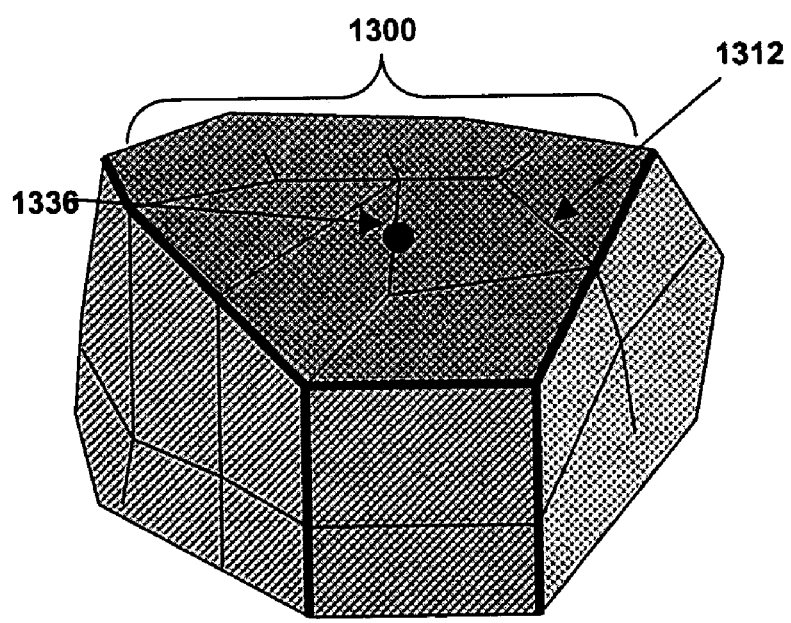

Additionally, as shown in FIGS. 13I, 13J, node 1310 owned by surface 1312 may be merged with a node 1334 (at a merged node 1336 at an average location of nodes 1310, 1334) owned by surface 1312 (same dimension) since the surfaces 1312 are the same entity.

Advantageously, volume mesh 500 may be initially generated using the sheet generation algorithm of FIG. 11 and step 1202 of FIG. 12 to generate a plurality of sheets of hexahedral elements along volume chords and associated twist planes (as shown in FIGS. 4–5). Thereafter, the generated mesh may be modified using further steps of the flow process of FIG. 12 (steps 1204, 1206) to identify a sheet to be removed, merge associated nodes in accordance with the merge rule, and remove (extract) the sheet to generate the modified volume mesh 702 as shown in FIG. 7.

Figure 8:
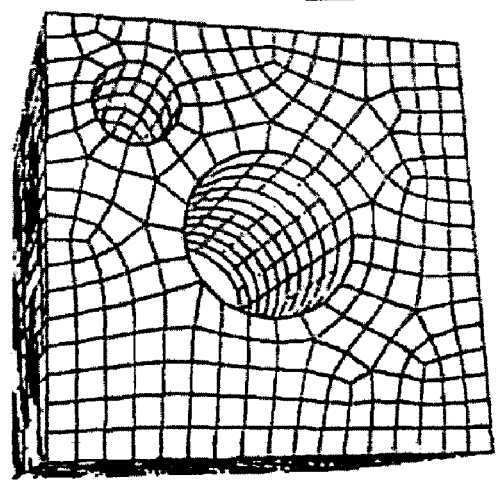
FIG. 8 is a block diagram of an exemplary existing volume mesh in accordance with embodiments of the present invention.
Figure 9:
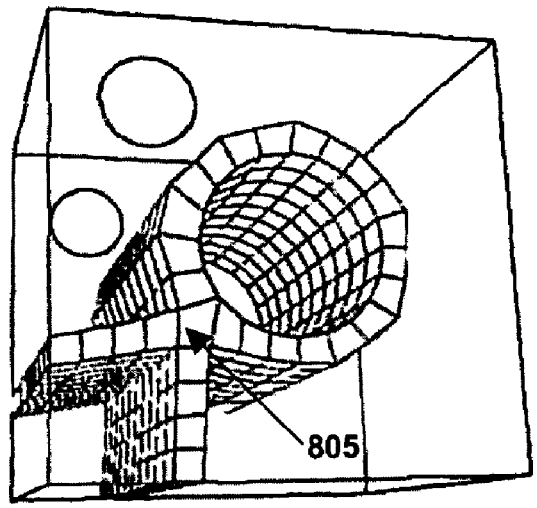
FIG. 9 is a block diagram of an exemplary generated sheet of polyhedral elements to be extracted from a volume mesh in accordance with embodiments of the present invention.
Figure 10:
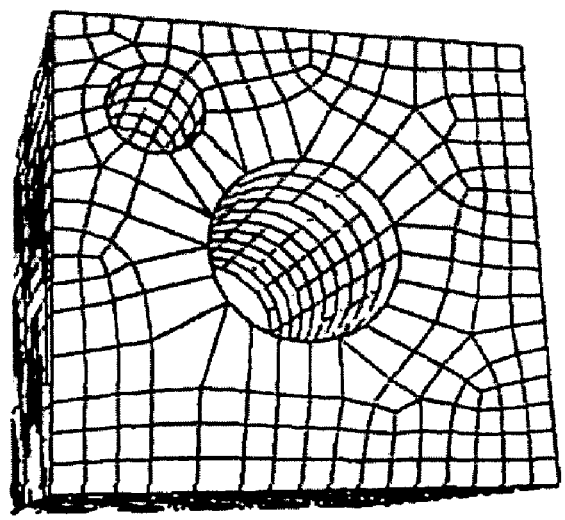
FIG. 10 is a block diagram of an exemplary modified volume mesh after sheet extraction in accordance with embodiments of the present invention.

Additionally, FIGS. 8–10 show an exemplary modification of a volume mesh 800 using the flow process of FIG. 12 in accordance with embodiments of the present invention. Mesh 800, prior to sheet extraction, is shown in FIG. 8. In FIG. 9, a sheet 802 to be extracted is identified (generated), and then in FIG. 10 the modified volume mesh 806 is shown wherein sheet 802 has been extracted (removed). Sheet 802 may be extracted due to poor quality (e.g., including to remove a self-intersection 805 as shown in FIG. 9 or a valent node on an outer edge of mesh 800).

In accordance with embodiments of the present invention, the volume mesh modification algorithm described herein may include a transition path extraction algorithm to extract a transition path (path between linking surfaces of the mesh which may lessen quality of the mesh) of the mesh. Firstly, a transition path may be defined in the mesh by using a shortest weighted path algorithm. The path may be defined by a set of linked nodes that form a line that passes through the volume mesh. The terminating ends of the path are located on the linking surfaces of the volume, and the path may be found using a shortest weighted path algorithm based on a predetermined algorithm (e.g., Dijkstra's algorithm). The distance of the path may be weighted to ensure the following: 1) minimize the number of nodes in the path, 2) keep the path as straight as possible, and 3) keep the path as far from non-terminating linking surfaces as possible. Advantageously, these objects may improve the quality of the resulting mesh by keeping the number of hexahedral elements in the transition to a minimum and allows as much room as possible for the elements in the transition to be smoothed.

In accordance with the weighted path algorithm, the weighted distance of a node may be defined as $dist = (p+1) + t + (w_{max} - w_{node})$, where:

$dist$ = weighted distance of the node;

$p$ = weighted distance of previous node in the path;

$t = 0$ if the node path does not turn, or 1 otherwise;

$w_{node}$ = weight of node; and $w_{max}$ = maximum weight of all nodes.

Figure 14A:
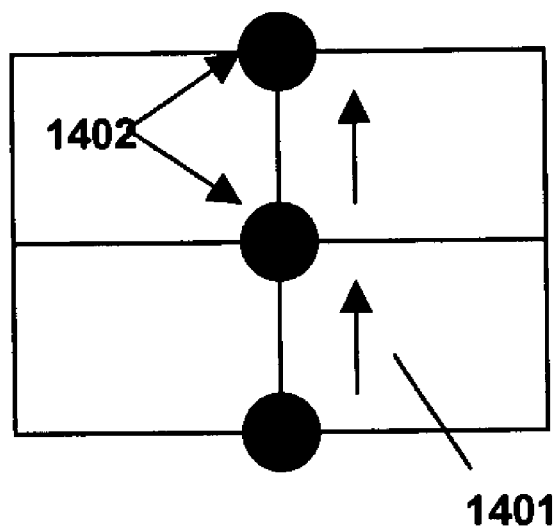
FIGS. 14A–14B are block diagrams showing exemplary transition paths in accordance with embodiments of the present invention.
Figure 14B:
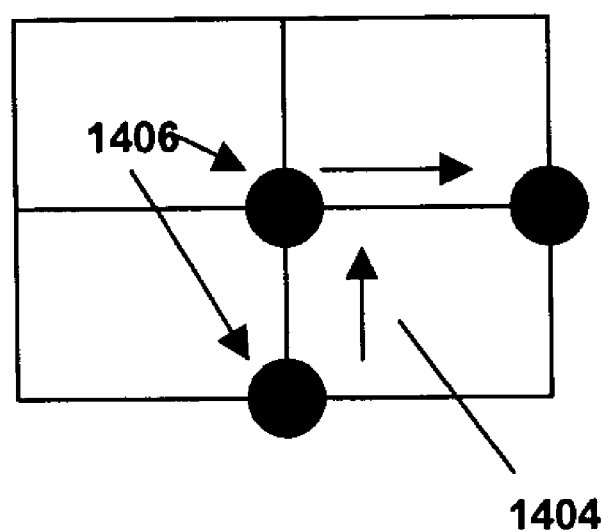

Advantageously, the distance a node is from the linking surfaces determines its weight value. A node on a linking surface may be weighted zero and the node furthest from any linking surface may be weighted $w_{max}$. Therefore, the value $(w_{max} - w_{node})$ may be added to the distance to meet the objective of moving the path away from the surfaces. The value t may be determined by the "straightness" of the path. In accordance with embodiments of the present invention, FIG. 14A shows a path (shown by arrows 1401) with consecutive nodes 1402 that do not turn along arrows 1401 and alternatively, FIG. 14B shows a path (shown by arrows 1404) with consecutive nodes 1406 that do turn.

As shown in Appendix D, the shortest weighted path algorithm may include a breadth first search that proceeds through steps 1–9. At step 7, if the search group is empty before the end node is reached then the search group may be disjoint and a path between the start and end nodes cannot be found so the algorithm may return a failure.

Figure 15:
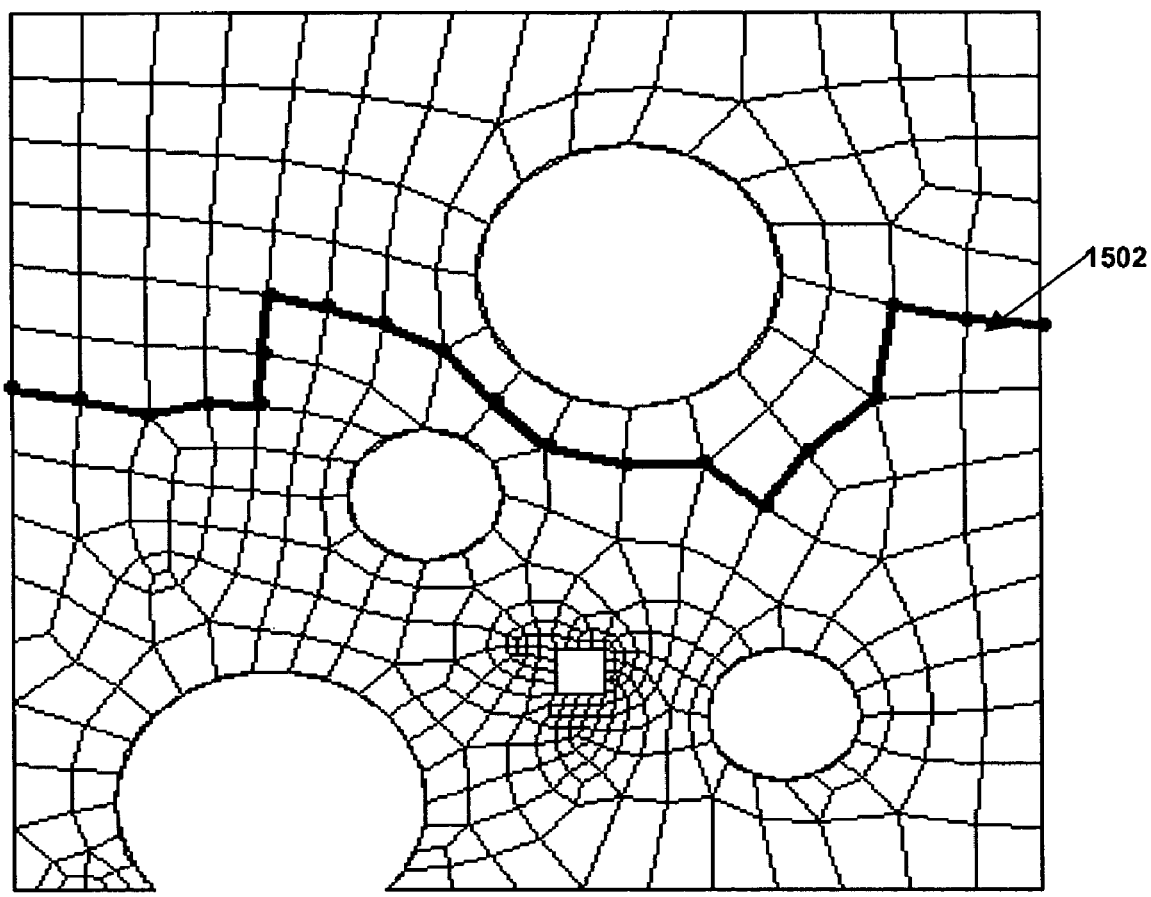
FIG. 15 is a block diagram showing an exemplary transition path of a volume mesh in accordance with embodiments of the present invention.

As the shortest weighted path algorithm in Appendix D is executed, each node that has been visited may hold a pointer to the node immediately before it in the path. Therefore, once the end node may be reached, the path may be found by starting with the end node and following the pointers back to the start node. FIG. 15 shows a transition path 1502 that may found through an existing volume mesh 1500 using the shortest weighted path algorithm of Appendix D in accordance with embodiments of the present invention.

Figure 16A:
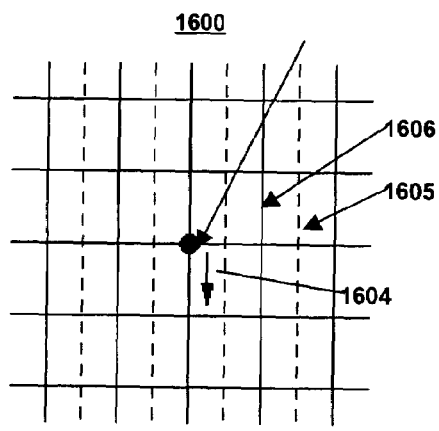
FIGS. 16A–16F are block diagrams showing exemplary performance of transition path extraction in accordance with embodiments of the present invention.

Once the transition path is found (determined), the path may be extracted (removed) from the mesh by removing the corresponding sheets of hexahedral elements using dual generation. FIGS. 16A–16F are block diagrams showing exemplary performance of transition path extraction and FIG. 17 shows a flow process diagram of transition path extraction in accordance with embodiments of the present invention. At step 1702, the transition path may be found (determined) using the shortest weighted path algorithm of Appendix D. As shown in FIG. 16A, a node 1602 and arrow 1604 indicate the transition point and predetermined direction of extraction for this exemplary (dual) mesh 1600. Alternatively, extraction may occur in other directions (e.g., up, right, left) from the transition node 1602. Using the dual generation technique shown in FIGS. 4, 5, mesh 1600 may be generated including (dual) volume chords 1605 (dashed lines), lying within adjacent twist planes, generated between the mesh edges 1606 (solid lines).

Figure 16B:
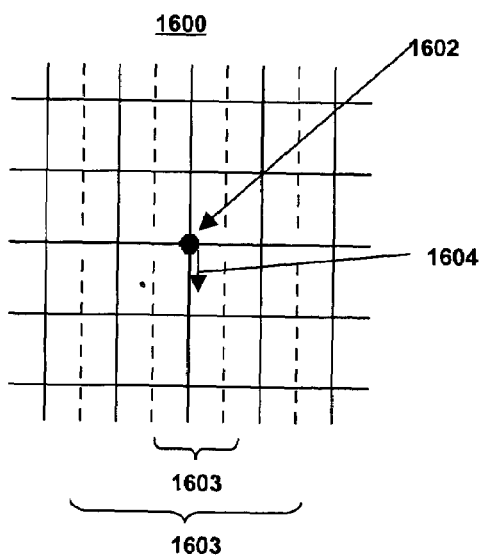
Figure 16C:
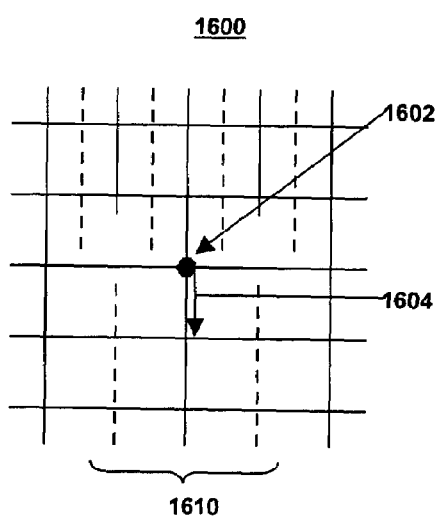
Figure 17:
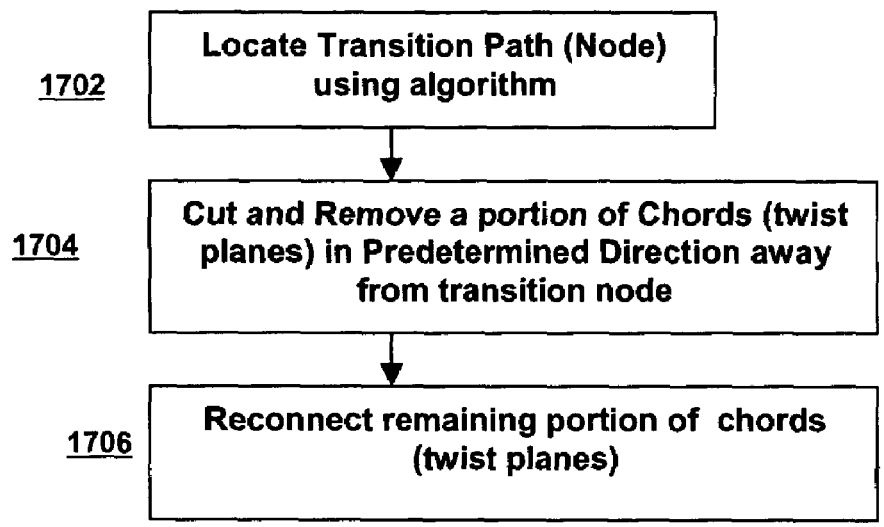
FIG. 17 is a flow process diagram of a transition path extraction algorithm to modify a volume mesh in accordance with embodiments of the present invention.

At step 1704, a portion 1603 of chords 1605 may be cut at the point (level) of the transition node 1602 and a subset 1608 (a middle portion in this example) of this portion 1603 may be removed in the direction following arrow 1604 as shown in FIGS. 16B, 16C. Additionally, a remaining portion 1610 of chords may be moved (to the middle in this example) as shown in FIG. 16C.

Figure 16D:
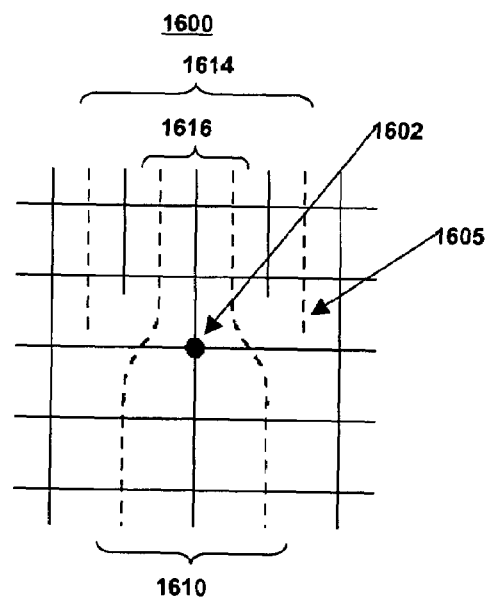
Figure 16E:
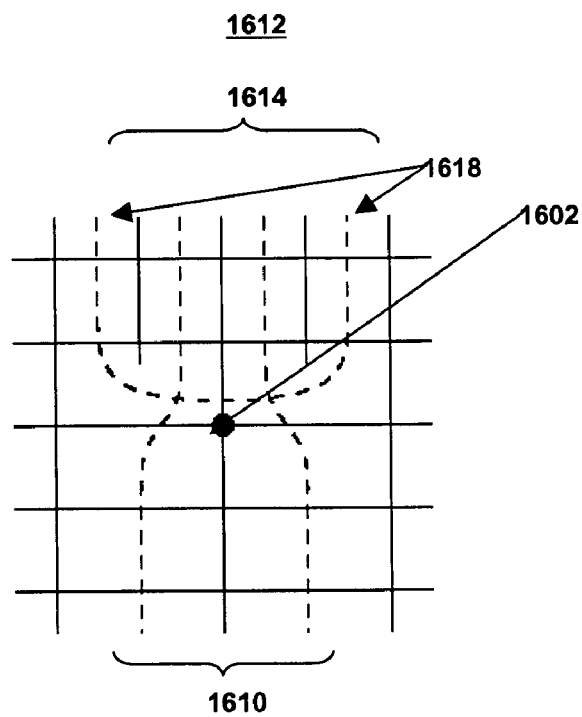
Figure 16F:
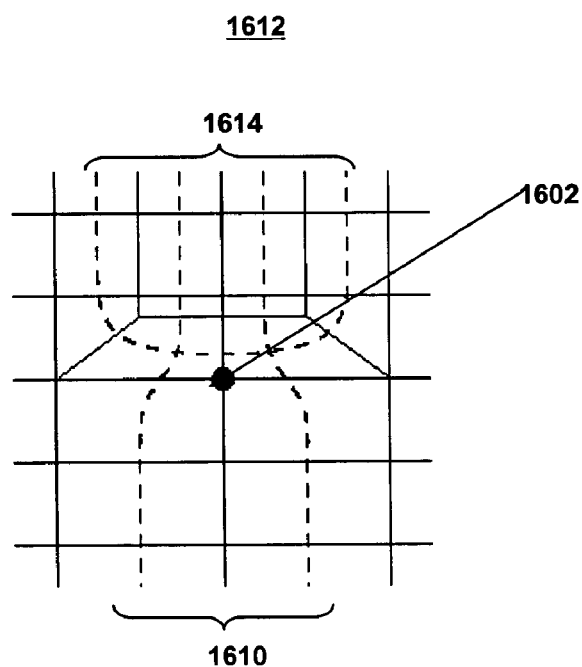

Thereafter, at step 1706, the remaining portion 1610 of chords may be reconnected at the point of the transition node 1602 to the unaffected (unmodified) portion 1614 of chords 1605 (above the node 1602) to produce a modified volume mesh 1612 from original mesh 1600 as shown in FIGS. 16D–16F. Advantageously for this example, remaining portion 1610 of chords 1605 may be tied together with the middle chords 1616 of the unaffected portion 1614 as shown in FIG. 16D. Thereafter, the two outer chords 1618 of the unaffected portion 1614 may be tied together as shown in FIG. 16E, and FIG. 16F shows the completed transition (modified) dual and mesh 1612.

Figure 18:
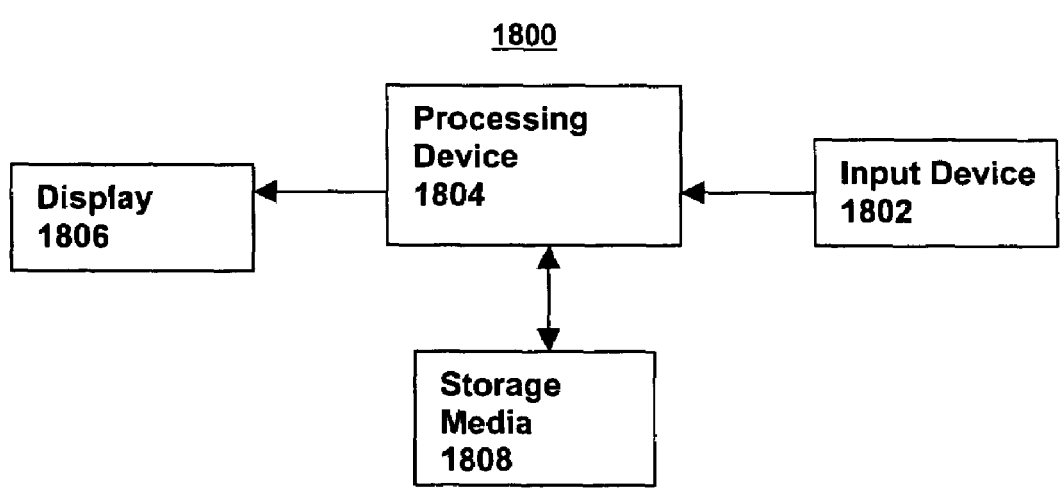
FIG. 18 is a block diagram of an exemplary system performing volume mesh modification in accordance with embodiments of the present invention.

As described herein, the volume mesh modification algorithms (including sheet and transition path extraction) described herein may be performed by a computer system using a machine-readable medium. FIG. 18 is a block diagram of an exemplary system performing dual generation in accordance with embodiments of the present invention. System 1800 includes an input device 1802, processing device 1804, display 1806, and storage media 1808. Advantageously, processing device 1804 may automatically execute the volume modification algorithm (including sheet and/or transition path extraction as shown in FIGS. 12, 17) by retrieving a volume mesh from storage media 1808, and display the resulting mesh on display 1806. Alternatively, one or more of the individual steps of the volume mesh modification algorithm may be performed in response to commands received via input device 1802.

A plurality of advantages may be provided in accordance with embodiments of the present invention including a volume mesh modification method (including sheet and transition path extraction) that allows mesh elements (e.g., hexahedrons) to be modified without regard to neighboring elements enabling independent editing of mesh elements. Additionally the volume mesh modification algorithm enables generation of a high-quality resulting mesh by recognizing global connectivity information (e.g., local self-intersections and self-tangencies of twist planes—volume chords) regarding the mesh.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

Appendix A

Glossary of Terms

Dual: Geometric copy of object (mesh) created in a dual space using volume chords and twist planes Chord: A (volume) chord is a collection of one or more segments. It is the dual of a row (column) of hexahedral elements in a volume (mesh). A chord can start at a face (surface centroid) and terminate at another face (i.e. a chord with two end points), or it can loop back and close on itself (an internal closed loop). A chord must contain at least one segment. A chord may only be defined on a twist plane at the intersection of two twist planes.

3-Cells: An intersection of twist planes, each intersection defining a (volume) chord, that define an n-sided polyhedron in dual space. The 3-cell is dual to a node, meaning one three cell exists for every node in the volume mesh.

Twist Plane: A continuous, three-dimensional surface used to represent a sheet of hexahedral mesh elements. The twist plane may be defined by the end points of two volume chords on a mesh boundary.

Centroid: a centroid is the intersection of two or more chords. For every intersection of chords in the dual, there exists one hexahedral element in the volume (mesh). A centroid is the dual of a hexahedral element.

APPENDIX B

Table 1

| Mesh Entity | Dimension | Dual Entity | Dimension |
|---|---|---|---|
| Hex Element | 3 | Centroid | 0 |
| Face | 2 | Chord | 1 |
| Edge | 1 | 2-cell | 2 |
| Node | 0 | 3-cell | 3 |

APPENDIX C

Table 2

| If node owner is: | Vertex | Curve | Surface | Body |
|---|---|---|---|---|
| Vertex | Never Merge. | Only if the vertex is on the curve, Merge to vertex | Only if the vertex is on the surface. Merge to vertex. | Always merge to vertex. |
| Curve |  | Only if both curves are the same. Merge to average location. | Only if the curve is on the surface. Merge to curve. | Always merge to curve. |
| Surface |  |  |  | Always merge to surface. |
| Body |  |  |  | Always merge to average location. |

Appendix D—Shortest Weighted Path Algorithm

Step 1: Define the search group

Step 2: Define the start and end node of the path;

Step 3: Weight all nodes in the search group;

Step 4: Set distance of all nodes to maximum integer value;

Step 5: Set (start node).dist=0;

Step 6: Set (start node).path=NULL;

Step 7: Search for path
    While end node not found
      If search group is empty
      Return failure;
      N=smallest unknown distance node;
      if N=end node
      goto Step 8;
      else
      Remove N from search group;
      Get nodes, M, adjacent to N;
      For each node M
      if {N.dist+1+M.t+(wmax−M.wnode)}<M.dist
        M.dist=N.dist+1+M.t+(wmax−M.wnode);
        M.path=N;
      end For;
    end While;

Step 8: Store path in list, L
    N=end node;
    While N.path !=NULL
    L.append(N);
    N=N.path;
    end While Step 9: return L;

What is claimed is:

1. A method for modifying a hexahedral volume mesh, comprising:

generating a sheet of hexahedral elements to remove from a volume mesh, wherein said mesh includes a plurality of three-dimensional (3D) hexahedrons each having six quadrilateral faces and eight nodes, each node formed at three intersecting edges, and wherein said sheet includes a subset of the plurality of 3D hexahedrons;

determining one or more sets of nodes for merging together within said sheet, each set satisfying a predetermined merging threshold;

merging the nodes for each determined set of nodes; and removing the sheet of hexahedrons from said volume mesh.

2. The method of claim 1, wherein the six quadrilateral faces for each 3D hexahedron include three sets of opposing faces, and wherein generating a sheet to remove includes:

a) selecting a first hexahedron to remove, the selected hexahedron having a first set of opposing faces, the first set including a first opposing face and a second opposing face;

b) determining a first neighboring hexahedron, the first neighboring hexahedron sharing the first opposing face with the selected hexahedron;

c) selecting the first neighboring hexahedron to remove, the first neighboring hexahedron having another face opposite the shared first opposing face;

d) repeating steps b) and c) until a predetermined sheet edge threshold being satisfied;

e) determining a second neighboring hexahedron, the second neighboring hexahedron sharing the second opposing face with the selected hexahedron;

f) selecting the second neighboring hexahedron to remove, the second neighboring hexahedron having another face opposite the shared second opposing face;

g) repeating steps e) and f) until the predetermined sheet edge threshold being satisfied;

h) grouping all selected hexahedrons into a first column of hexahedrons;

i) selecting the first hexahedron, the selected hexahedron having a second set of opposing faces, the second set including a third opposing face and a fourth opposing face;

j) determining a third neighboring hexahedron, the third neighboring hexahedron sharing the third opposing face with the selected hexahedron;

k) selecting the third neighboring hexahedron to remove;

l) repeating steps a) through h) until a second column of hexahedrons is grouped;

m) selecting the first hexahedron;

n) determining a fourth neighboring hexahedron, the fourth neighboring hexahedron sharing the fourth opposing face with the selected hexahedron;

o) selecting the fourth neighboring hexahedron to remove;

p) repeating steps a) through h) until a third column of hexahedrons is grouped;

q) repeating steps a) through p) until the sheet edge threshold being satisfied; and r) grouping all columns of hexahedrons into the sheet to remove.

3. The method of claim 1, wherein generating a sheet to remove includes:

a) selecting a hexahedron to remove, the selected hexahedron having three sets of opposing faces from the six quadrilateral faces, each set comprising a first opposing face and a second opposing face;

b) determining a neighboring hexahedron to remove, the neighboring hexahedron sharing one face with the selected hexahedron;

c) repeating step b) until all neighboring hexahedrons have been determined;

d) selecting the neighboring hexahedron to remove;
e) repeating steps a) through d) until all hexahedrons in the sheet to remove have been found.

4. The method of claim 1, wherein determining one or more sets of nodes for merging together includes:
   a) selecting a hexahedron in the sheet to remove, the selected hexahedron having three sets of opposing faces from the six quadrilateral faces, each set comprising a first opposing face and a second opposing face;
   b) identifying the one set of opposing faces that are not shared by another hexahedron in the sheet, wherein each face includes four nodes;
   c) pairing the nodes in the first opposing face with the nodes in the second face;
   d) identifying each node pair for merging; and
   e) repeating steps a) through d) until all node pairs in the sheet have been identified for merging.

5. The method of claim 4, wherein determining one or more sets of nodes for merging together includes:
   a) selecting hexahedrons in a sheet self-intersection to remove;
   b) identifying sets of nodes at the sheet self-intersection for merging into a single node; and
   c) repeating steps a) through b) until all sets of nodes at the sheet self-intersection have been identified for merging.

6. The method of claim 1, wherein determining one or more sets of nodes for merging together within said sheet includes:
   a) determining an owning geometric entity for each node in each set of nodes for merging;
   b) determining the owning geometric entity with the lowest dimension;
   c) comparing all other owning geometric entities with the lowest dimension owning geometric entity;
   d) determining whether to merge together said sets of nodes in accordance with said comparing and said predetermined merging threshold.

7. The method of claim 6, wherein merging the nodes for each determined set of nodes includes:
   a) merging each node in the set into the node with the lowest dimension owning geometric entity for owning geometric entities with different dimensions, wherein the lowest dimension owning geometric entity is a subset of the other owning geometric entities; and
   b) merging each node in the set into an average location of all the nodes for owning geometric entities with the same dimension, wherein each owning geometric entity has at least one dimension.

8. The method of claim 1, wherein merging the nodes for each determined set of nodes includes:
   a) merging each node in the set into the node with the lowest dimension owning geometric entity for owning geometric entities with different dimensions, wherein the lowest dimension owning geometric entity is a subset of the other owning geometric entities; and
   b) merging each node in the set into an average location of all the nodes, for owning geometric entities with the same dimension; wherein each owning geometric entity has at least one dimension.

9. A method for generating a hexahedral volume mesh by extracting a sheet of hexahedrons, comprising:
   a) generating an initial hexahedral volume mesh, wherein the mesh includes a plurality of three-dimensional (3D) hexahedrons, each 3D hexahedron having six quadrilateral faces and eight nodes, each node formed at three intersecting edges;
   b) determining an area of poor mesh quality in the initial mesh;
   c) generating a sheet of poor mesh quality from said area to remove, wherein the sheet includes a subset of the plurality of 3D hexahedrons;
   d) determining one or more sets of nodes for merging together, each set satisfying a predetermined merging threshold;
   e) merging the nodes for each set of nodes; and
   f) extracting the sheet from the initial hexahedral mesh.

10. The method of claim 9, wherein identifying a sheet includes using a dual of the initial hexahedral mesh.

11. The method of claim 9, wherein the initial hexahedral mesh is selected from the group consisting of an all-hexahedral swept mesh, multiple all-hexahedral swept meshes for a subdivided geometric entity, a quadrilateral mesh from a source surface to a target surface, and combinations thereof.

12. The method of claim 9, wherein determining an area of poor mesh quality includes identifying an inverted node.

13. The method of claim 9, wherein the determining an area of poor mesh quality includes identifying a self-intersecting sheet.

14. The method of claim 9, wherein determining an area of poor mesh quality includes identifying a valent node to remove.

15. The method of claim 9, wherein the six quadrilateral faces for each 3D hexahedron include three sets of opposing faces, and wherein generating a sheet to remove includes:
   a) selecting a first hexahedron to remove, the selected hexahedron having a first set of opposing faces, the first set including a first opposing face and a second opposing face;
   b) determining a first neighboring hexahedron, the first neighboring hexahedron sharing the first opposing face with the selected hexahedron;
   c) selecting the first neighboring hexahedron to remove, the first neighboring hexahedron having another face opposite the shared first opposing face;
   d) repeating steps b) and c) until a predetermined sheet edge threshold being satisfied;
   e) determining a second neighboring hexahedron, the second neighboring hexahedron sharing the second opposing face with the selected hexahedron;
   f) selecting the second neighboring hexahedron to remove, the second neighboring hexahedron having another face opposite the shared second opposing face;
   g) repeating steps e) and f) until the sheet edge threshold being satisfied;
   h) grouping all selected hexahedrons into a first column of hexahedrons;
   i) selecting the first hexahedron, the selected hexahedron having a second set of opposing faces, the second set comprising a third opposing face and a fourth opposing face;
   j) determining a third neighboring hexahedron, the third neighboring hexahedron sharing the third opposing face with the selected hexahedron;
   k) selecting the third neighboring hexahedron to remove;
   l) repeating steps a) through h) until a second column of hexahedrons is grouped;

selecting the first hexahedron;
n) determining a fourth neighboring hexahedron, the fourth neighboring hexahedron sharing the fourth opposing face with the selected hexahedron;
o) selecting the fourth neighboring hexahedron to remove;
p) repeating steps a) through h) until a third column of hexahedrons is grouped;
q) repeating steps a) through p) until the sheet edge criterion is met; and
r) grouping all columns of hexahedrons into the sheet to remove.

16. The method of claim 9, wherein generating a sheet to remove includes:
a) selecting a hexahedron to remove, the selected hexahedron having three sets of opposing faces from the six quadrilateral faces, each set comprising a first opposing face and a second opposing face;
b) determining a neighboring hexahedron to remove, the neighboring hexahedron sharing one face with the selected hexahedron;
c) repeating step b) until all neighboring hexahedrons have been found;
d) selecting the neighboring hexahedron to remove;
e) repeating steps a) through d) until all hexahedrons in the sheet to remove have been found.

17. The method of claim 9, wherein determining one or more sets of nodes for merging together includes:
a) selecting a hexahedron in the sheet to remove, the selected hexahedron having three sets of opposing faces from the six quadrilateral faces, each set comprising a first opposing face and a second opposing face;
b) identifying the one set of opposing faces that are not shared by another hexahedron in the sheet, wherein each face comprises four nodes;
c) pairing the nodes in the first opposing face with the nodes in the second face;
d) identifying each node pair for merging; and
e) repeating steps a) through d) until all node pairs in the sheet have been identified for merging.

18. The method of claim 17, wherein determining one or more sets of nodes for merging together includes:
a) selecting hexahedrons in a sheet self-intersection to remove;
b) identifying sets of nodes at the sheet self-intersection for merging into a single node; and
c) repeating steps a) through b) until all sets of nodes at the sheet self-intersection have been identified for merging.

19. The method of claim 9, wherein determining one or more sets of nodes for merging together includes:
a) determining an owning geometric entity for each node in each set of nodes for merging;
b) determining the owning geometric entity with the lowest dimension;
c) comparing all other owning geometric entities with the lowest dimension owning geometric entity; and
d) determining whether to merge together said sets of nodes in accordance with said comparing and said predetermined merging threshold.

20. The method of claim 19, wherein merging the nodes for each predetermined set of nodes includes:
a) merging each node in the set into the node with the lowest dimension owning geometric entity for owning geometric entities with different dimensions, wherein the lowest dimension owning geometric entity is a subset of the other owning geometric entities; and
b) merging each node in the set into an average location of all the nodes for owning geometric entities with the same dimension, wherein each owning geometric entity has at least one dimension.

21. The method of claim 9, wherein merging the nodes for each determined set of nodes includes:
a) merging each node in the set into the node with a lowest dimension owning geometric entity for owning geometric entities with different dimensions, wherein the lowest dimension owning geometric entity is a subset of the other owning geometric entities; and
b) merging each node in the set into an average location of all the nodes for owning geometric entities with the same dimension, wherein each owning geometric entity has at least one dimension.

22. A sheet extractor for modifying a hexahedral mesh, comprising:
a controller for performing the steps of:
generating a sheet of hexahedrons to remove from a hexahedral mesh, wherein the mesh includes a plurality of three-dimensional (3D) hexahedrons, each 3D hexahedron comprising eight nodes, and wherein said sheet including a subset of said plurality of 3D hexahedrons; and
determining one or more sets of nodes from said sheet for merging together, each determined set satisfying a predetermined merging threshold.

23. The sheet extractor of claim 22, wherein said controller further performing the steps of:
selecting a first hexahedron to remove from said sheet, including three sets of opposing faces, wherein each set includes a first opposing face and a second opposing face;
selecting a neighboring hexahedron to remove, comprising three sets of opposing faces, the neighboring hexahedron sharing one face with the selected first hexahedron; and
selecting a plurality of other neighboring hexahedrons to remove, each neighboring hexahedron comprising three sets of opposing faces, each neighboring hexahedron sharing a face with another hexahedron.

24. The sheet extractor of claim 23, wherein determining one or more sets of nodes includes:
determining four node pairs for each hexahedron including:
determining four nodes associated with the first opposing face; and
determining four additional nodes associated with the second opposing face, wherein each node in the first opposing face being paired with a node in the second opposing face.

25. The sheet extractor of claim 22, wherein determining one or more sets of nodes includes:
determining a specific owning geometric entity for each node to be merged;
determining a lowest dimension owning geometric entity for each set of merge nodes;
determining a dimension associated with each owning geometric entity;
merging each node in the set into a node with the lowest dimension owning geometric entity for owning geometric entities with different dimensions, wherein the lowest dimension owning geometric entity is a subset of other owning geometric entities;

merging each node in the set into an average location for all nodes for owning geometric entities with the same dimension, wherein each owning geometric entity has at least one dimension.

26. A method for modifying a volume mesh, comprising:

connecting a plurality of rows of elements of a volume mesh using connecting lines, where said connecting lines, together with associated planes, form a plurality of three-dimensional regions, said plurality of three-dimensional regions forming a sheet of volume mesh elements for removal from said mesh;

associating each volume mesh element with at least one set of nodes for merging together, each set satisfying a predetermined merging threshold;

merging said at least one set of nodes together for each element and removing said sheet to produce a modified form of said volume mesh.

27. A machine-readable medium having stored thereon a plurality of executable instructions, the plurality of instructions comprising instructions to:

connect a plurality of rows of elements of a volume mesh using connecting lines, where said connecting lines, together with associated planes, form a plurality of three-dimensional regions, said plurality of three-dimensional regions forming a sheet of volume mesh elements for removing from said mesh;

associate each volume mesh element with at least one set of nodes for merging together, each set satisfying a predetermined merging threshold;

merge said at least one set of nodes together for each element and removing said sheet to produce a modified form of said volume mesh.

28. A method for modifying a volume mesh, comprising:

connecting a plurality of rows of elements of a volume mesh using connecting lines, where said connecting lines, together with associated planes, form a plurality of three-dimensional regions, said plurality of three-dimensional regions forming a sheet of volume mesh elements, each mesh element including a plurality of surfaces;

determining at least one node linking a plurality of surfaces in said sheet using a predetermined algorithm;

disconnecting a plurality of said connecting lines, together with a plurality of said associated planes, at said at least one node and removing a portion of said plurality of connecting lines, together with a portion of said plurality of associated planes, in a predetermined direction away from said point;

reconnecting a remaining portion of said plurality of connecting lines, together with a remaining portion of said plurality of associated planes, at said at least one node to produce a modified form of said volume mesh.

29. A machine-readable medium having stored thereon a plurality of executable instructions, the plurality of instructions comprising instructions to:

connect a plurality of rows of elements of a volume mesh using connecting lines, where said connecting lines, together with associated planes, form a plurality of three-dimensional regions, said plurality of three-dimensional regions forming a sheet of volume mesh elements, each mesh element including a plurality of surfaces;

determine at least one node linking a plurality of surfaces in said sheet using a predetermined algorithm;

disconnect a portion of said connecting lines, together with a portion of said associated planes, at said at least one node and removing said portion in a predetermined direction away from said point;

reconnect a remaining portion of said connecting lines, together with a remaining portion of said associated planes, at said at least one node to produce a modified form of said volume mesh.

* * * * *